P. HELDMANN.
SCALLOPING MACHINE.
APPLICATION FILED MAR. 13, 1911.
1,039,534.
Patented Sept. 24, 1912.
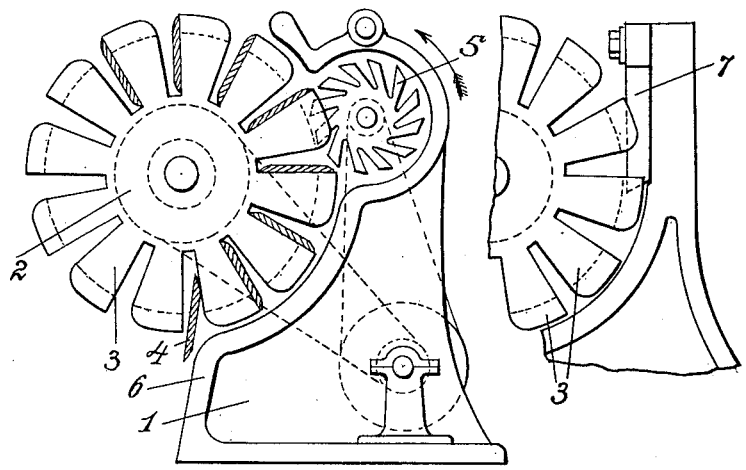
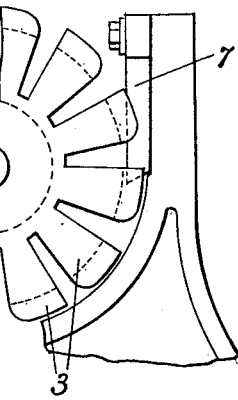
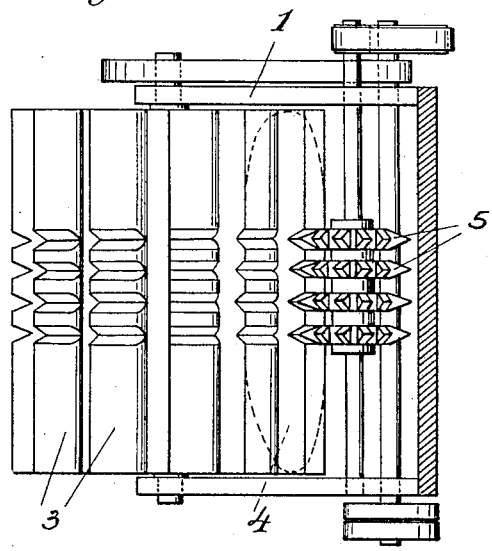
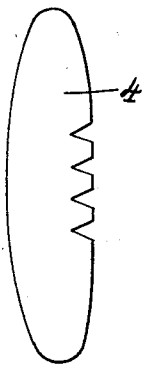
Witnesses.
Inventor.

UNITED STATES PATENT OFFICE.

PETER HELDMANN, OF FRANKFORT-ON-THE-MAIN, GERMANY, ASSIGNOR TO CORPORATION OF MASCHINENFABRIK MOENUS A. G., OF FRANKFORT-ON-THE-MAIN-BOCKENHEIM, GERMANY.

SCALLOPING-MACHINE.

1,039,534.   Specification of Letters Patent.   Patented Sept. 24, 1912.

Application filed March 13, 1911. Serial No. 613,980.

*To all whom it may concern:*

Be it known that I, PETER HELDMANN, engineer, a subject of the German Emperor, and resident of Frankfort-on-the-Main, Germany, with the post-office address Moltke Allee 92, have invented new and useful Improvements in Scalloping - Machines, of which the following is a specification.

Hitherto counters or stiffeners and the like for boots or shoes and other materials have been scalloped by stamps adapted to be longitudinally displaced and operated by a suitable device.

By the present invention the output is increased by use of a machine in which the separate counters or stiffeners are presented in succession by a rotating carrying wheel or the like to a suitably profiled cutting tool.

The invention is illustrated in the accompanying drawings wherein—

Figure 1 shows a scalloped counter or stiffener; Fig. 2 a side elevation partly in section of one construction of the machine and Fig. 3 a plan thereof. Fig. 4 shows a modified construction.

A drum 2, suitably journaled in the frame 1 of the machine, has blades 3 for carrying the counters or stiffeners 4. Parallel to the drum there is journaled a cutting tool 5 which rotates in the direction opposite to that of the drum, as shown by the arrows in Fig. 2. The edge of each blade 3 is notched to correspond with the scallops required in the counter or stiffener and the cutting tool 5 has corresponding teeth.

The drum and cutter are driven in any suitable manner, for example by the pulleys shown in the drawings. The peripheral speed of the drum depends on the skill of the operator, that of the cutter depends both on this factor and on the speed with which it cuts. When in operation the several counters are placed in succession on the blades by the operator and then conveyed by the drum to the cutter which scallops them, and finally slide down the incline 6. No special devices for clamping the counters on the blades or elements of the carrier, or for liberating such counters therefrom, are necessary in the present machine, as the counters are set between the blades and each counter rests firmly against the properly shaped side face of one of the blades at the time when the cutting tool begins to operate upon such counter. The profile of the blades 3 and of the cutter 5 is such that the scalloping is effected by a pure shearing action, so that a smooth cut is obtained, not inferior to that obtained by the usual stamps. It is only a question of construction whether the cutter is a single piece or is composed of separate pieces placed together. Obviously the present machine can also be used for scalloping or notching other materials.

In the construction shown in Fig. 4, instead of the rotating cutter there is used a fixed, suitably profiled knife 7 which may be made in one piece or consist of a number of knives. The operation is then the same, only the rotation of the drum must be reversed.

Now what I claim and desire to secure by Letters Patent is the following:

1. In a scalloping machine, the combination of a rotary carrier having radially arranged blades between which the pieces of material are freely set, and from which they are freely discharged, and a scalloping tool coöperating with said carrier adjacent the peripheral portion thereof.

2. In a scalloping machine, the combination of a rotary carrier having a plurality of radial blades, the edges of which, at the periphery of the carrier, are provided with notches, the pieces of material being freely set in between the blades so that each piece is positioned on a side face of one blade, overlying the notches of the blade, and a relatively fixed cutting tool arranged at the periphery of the carrier and entering the notches of the several blades.

3. In a scalloping machine, the combination of a rotary carrier having a plurality of radial blades, the edges of which, at the periphery of the carrier, are provided with notches, the pieces of material being freely set in between the blades so that each piece is positioned on a side face of one blade, overlying the notches of the blade, and a scalloping tool coöperating with the notches to cut away the material overlying said notches.

4. In a scalloping machine the combination of a rotary carrier having a plurality of radial blades, the pieces of material being freely set in between the blades so that each piece is positioned on a side face of one blade, and a scalloping tool coöperating with said carrier to scallop the material.

In testimony that I claim the foregoing as my invention, I have signed my name in presence of two witnesses, this 28th day of February, 1911.

PETER HELDMANN.

Witnesses:
JEAN GRUND,
CARL GRUND.